July 9, 1935.  S. SCHNELL  2,007,256
BRAKING APPARATUS
Filed Sept. 17, 1931  2 Sheets-Sheet 1

Inventor
S. SCHNELL
By E. E. Huffman
Att'y.

July 9, 1935.  S. SCHNELL  2,007,256
BRAKING APPARATUS
Filed Sept. 17, 1931  2 Sheets-Sheet 2

Inventor
S. SCHNELL
By E. E. Huffman
Att'y.

Patented July 9, 1935

2,007,256

UNITED STATES PATENT OFFICE 2,007,256

BRAKING APPARATUS

Steve Schnell, St. Louis, Mo., assignor to Wagner Electric Corporation, St. Louis, Mo., a corporation of Delaware Application September 17, 1931, Serial No. 563,256

9 Claims. (Cl. 188—78)

My invention relates to vehicle braking apparatus, its object being to provide an improved brake embodying two brake shoes pivoted together at their ends which are displaced from the primary actuating mechanism, and means for exerting radial pressure upon one or both of said ends, which pressure will be derived from the frictional drag on one of the shoes.

Figure 1:
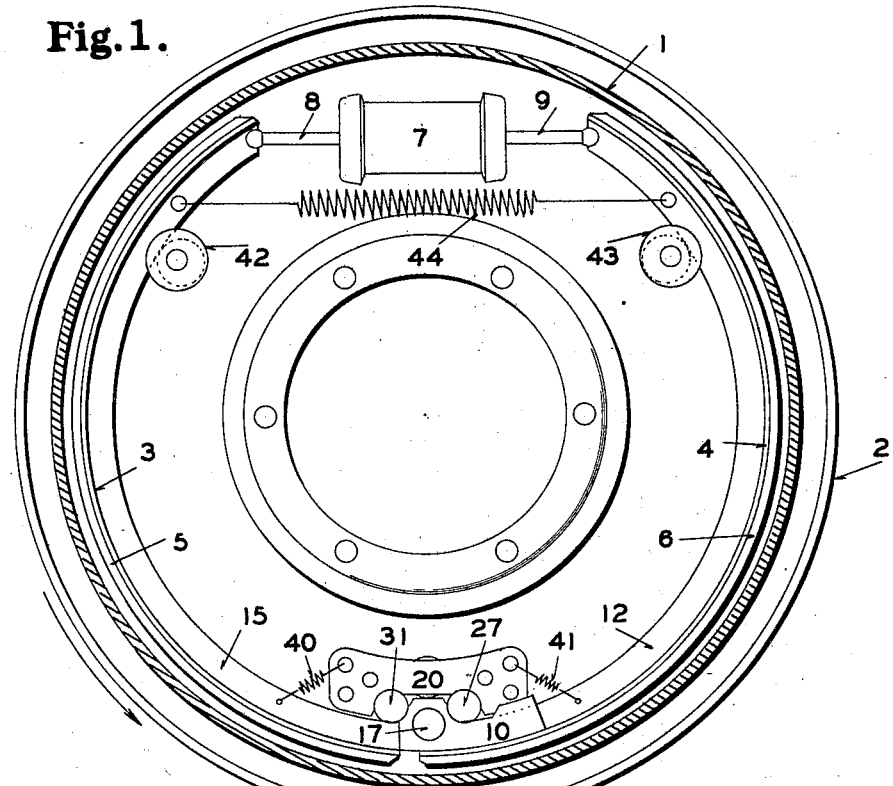
Figure 2:
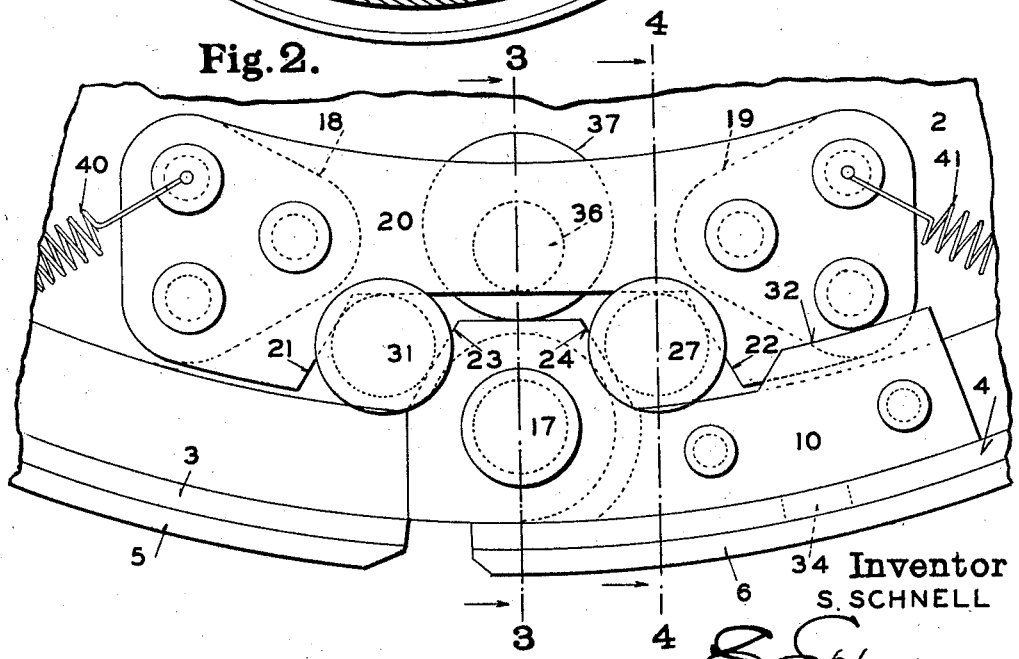
Figure 3:
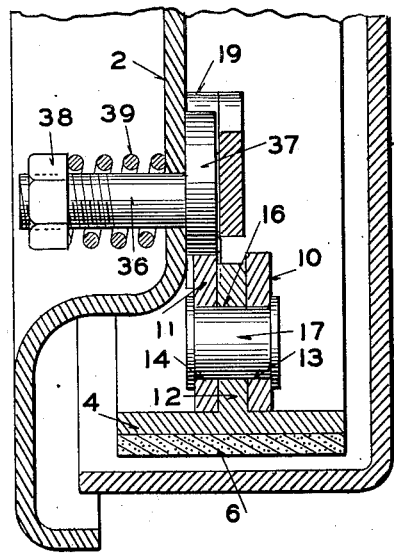
Figure 4:
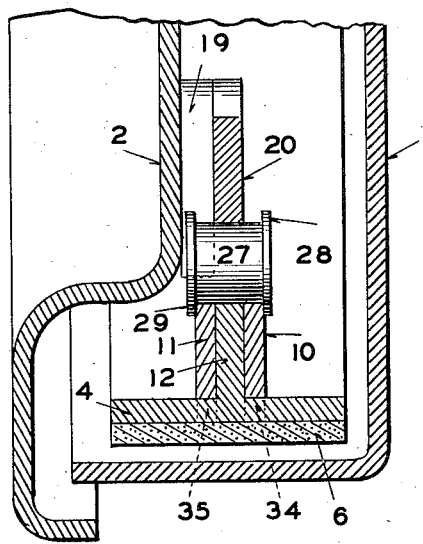
Figure 5:
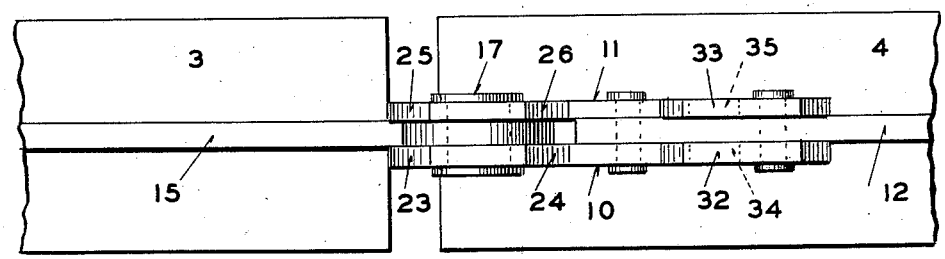
Figure 7:
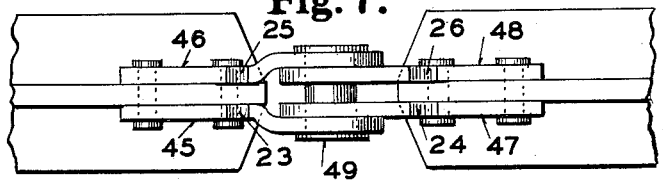
Figure 6:
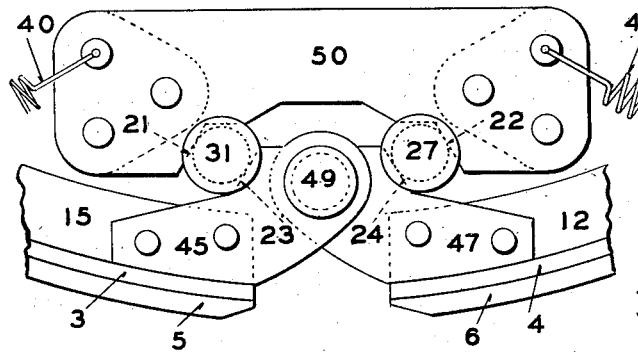

The specific objects and advantages of my invention will become apparent from the following description taken in connection with the accompanying drawings in which Figure 1 is a side elevation of the preferred form of my invention showing the radial pressure producing device adjacent the pivotal connection of the shoes; Figure 2 is an enlarged view of the pivotal connection of the shoes and the pressure producing device; Figure 3 is a cross-sectional view on the line 3—3 of Figure 1; Figure 4 is a cross-sectional view on the line 4—4 of Figure 1; Figure 5 is a top view of the pivotal connection of the brake shoes; Figure 6 is a side elevation of a modified connecting means; and Figure 7 is a top view of the pivotal connection shown in Figure 6.

Referring to the drawings in detail and especially to Figures 1 to 5 inclusive, 1 designates a drum connected by suitable means to a wheel of a vehicle. Adjacent the open side of the drum and secured to a fixed part of the vehicle is a backing plate 2 which supports the brake shoes and my novel pressure producing device within the drum. A pair of floating brake shoes 3 and 4 carrying brake linings 5 and 6, respectively, are mounted in end to end relation within the drum 1 and are adapted to be expanded into engagement with the drum by means of the cylinder 7 containing the usual actuating pistons connected with the ends of the shoes by the piston rods 8 and 9.

Plates 10 and 11 are riveted to the end of the shoe 4 opposite the actuating cylinder, one on each side of the reinforcing web 12 with the enlarged free end of each plate having a circular opening 13 and 14 therethrough. The adjacent end of shoe 3 has its web 15 extending beyond the end of the shoe and is provided with a circular opening 16, preferably of the same size as openings 13 and 14, and is interfitted with the plates 10 and 11. A pin 17 is received in the coinciding openings 13, 14 and 16 to pivotally connect the shoes together. Riveted to the backing plate but spaced therefrom by a pair of spacers 18 and 19 is a plate 20, the lower edge of which has a cut-out recess forming spaced apart inclined surfaces 21 and 22 diverging toward the drum surface. The enlarged ends of the plates 10 and 11 adjacent the pivotal connection of the shoes extend into the cut-out recess of the plate 20, with each plate being provided with a pair of inclined surfaces 23 and 24 and 25 and 26, respectively. The inclined surfaces 23 and 25 are spaced from and substantially parallel with the inclined surface 21 of the plate 20, and the inclined surfaces 24 and 26 are spaced from and substantially parallel with the inclined surface 22 of the plate 20. Interposed between and in rolling contact with the spaced apart inclined surface 22, and 24 and 26 is a roller 27 provided with flanged ends 28 and 29 to prevent accidental removal. Also, interposed between and in rolling contact with the spaced apart inclined surface 21, and 23 and 25 is a similar roller 31.

The riveted ends of the plates 10 and 11 are extended above the web 12 of the shoe 4, as shown at 32 and 33, to form a groove into which the lower edge of the plate 20 is adapted to lie (see Figure 2) thereby preventing lateral and tilting movement of the ends of the shoes when the brakes are applied. The plate 20 is of slightly smaller width than the groove so as to prevent any binding as the shoes are urged toward the drum. The plates 10 and 11 are also provided with extensions 34 and 35 fitting into suitable openings in the shoe face to assist the rivets in taking the circumferential thrust between the plates and the shoe.

A bolt 36 is mounted in the backing plate 2 and carries an eccentric head 37 and a wrench receiving head 38. The eccentric head 37 of the bolt lies within the drum between the plate 21 and the backing plate and is adapted to contact with the top of the plate 11. The wrench receiving head is on the outside of the backing plate and has interposed between it and the backing plate a coiled spring 39 thereby providing a convenient adjustable stop to adjust the "off" position clearance of the shoes with respect to the drum to compensate for wear on the linings.

Springs 40 and 41 are connected to the plate 20 and to the shoes 3 and 4 to hold the rollers against the inclined surfaces and to also assist in retracting the shoes when the brake is released by the actuating means. Adjustable stops 42 and 43, similar to the one disclosed in Figure 3, are mounted in the backing plate adjacent the actuated ends of the shoes to adjust the "off" position clearance between the shoe linings and the drum at these points. A spring 44 connects the actuated ends of the shoes 3 and 4 to return the shoes against the stops 42 and 43 when the brakes have been released by the actuating means.

In operation, when the ends of the shoes 3 and 4 are expanded by the actuating cylinder and pistons into engagement with the drum, the shoe 3 tends to be carried with the drum in its direction of rotation (indicated by the arrow in Figure 1) and through its pivotal connection with the shoe 4, acts against the actuating rod 7 of the shoe 4 to force it into engagement with the drum. The circumferential movement of the shoe 3 at the same time causes the inclined surfaces 24 and 26 of the plates 10 and 11 to act against the inclined surface 21 of the fixed plate 20 through the roller 31 and thereby radially force the shoe 4 at this point into engagement with the drum. Since the shoe 3 is connected to the shoe 4 by the pivot 17, it will also be radially urged toward the drum by the inclined surfaces cooperating through the roller 31. Thus by means of my radial pressure producing device I am able to convert part of the circumferential movement of shoe 3, which acts on shoe 4, into a radial pressure on the adjacent ends of the connected shoes, thereby producing a more uniform wear of the brake linings.

When the drum is rotating in the opposite direction and the brake shoes are applied, the roller 27 cooperates with its inclined surfaces in the same manner as roller 31 to apply pressure to the shoes at this point. In this direction of rotation, the shoe 4 becomes the servo shoe and shoe 3 the served shoe.

Referring to Figures 6 and 7, I have shown a slight modification of my invention, especially with respect to the means employed in pivotally connecting the adjacent end of the brake shoes. The web 15 of the brake shoe 3 has riveted thereto, a pair of plates 45 and 46 provided with inclined surfaces 23 and 25, respectively. The free ends of these plates extend beyond the ends of the shoe and are bent slightly out of line with their body portion. The web 12 of shoe 4 has riveted thereto a pair of plates 47 and 48 provided with the inclined surfaces 24 and 26, respectively. The free ends of these plates extend between the ends of the plates 45 and 46 and are pivoted thereto by the pin 49. A plate 50, similar to the plate 20 in the preferred embodiment, is suitably spaced from the backing plate and is provided on its lower edge with the inclined surfaces 21 and 22 spaced from and approximately parallel with the inclined surfaces 23 and 25 and 24 and 26, respectively, on the plates 45, 46, 47 and 48.

The rollers 27 and 31 cooperate with the inclined surfaces in the same manner as in the preferred embodiment and are held against the surfaces by the springs 40 and 41. The operation of the modification shown in Figures 6 and 7 is identical with that previously described.

In the construction described, there is no danger of the shoes becoming locked to the drum since the rollers have only a line contact with the inclined surfaces. It is also obvious that the amount of radial pressure may be varied by changing the angle of the inclined surfaces.

My improved braking mechanism embodies the advantages of the pivoted shoe type of brake with respect to bringing the free ends of the shoes into engagement with the drum, with light and uniform pressure and also has a braking efficiency comparable to that of the regenerative type of band brake in which radial pressure is produced upon the central portion of the band.

Having fully described my invention, what I claim as new and desire to secure by Letters Patent of the United States is:

1. In braking apparatus, the combination of a rotatable member, a pair of pivotally connected brake shoes arranged end to end and movable toward the rotatable member at their point of connection, said shoes being capable of circumferential movement, actuating means for applying the shoes to the rotatable member, and anchor means adjacent the connected ends of the shoes for taking the entire torque of the brake and for applying a radial pressure to the end of one of the shoes.

2. In braking apparatus, the combination of a rotatable member, a pair of pivotally connected brake shoes in end to end relation and adapted to cooperate with said rotatable member, said shoes being capable of limited circumferential movement, actuating means at the adjacent free ends of the shoes for expanding the shoes into engagement with the rotatable member, and means adjacent the connection of the shoes and independent of the actuating means for applying radial pressure to both of said shoes in either direction of rotation of the rotatable member, said means also forming the sole anchor for the brake shoes.

3. In braking apparatus, the combination of a support, a rotatable drum, a pair of shoes pivoted together at one of their adjacent ends, said shoes being capable of limited circumferential movement, means for expanding the other adjacent ends of the shoes into engagement with the drum, a member carried by the support near the pivotal connection of said shoes and provided with an inclined surface, an inclined surface on one of the shoes adjacent the pivotal connection and inclined in the same direction as the first named inclined surface but spaced therefrom, and a floating member in rolling contact with the inclined surfaces.

4. In braking apparatus, the combination of a support, a rotatable drum, a pair of shoes pivoted together at one of their adjacent ends, said shoes being capable of limited circumferential movement, means for expanding the other adjacent ends of the shoes into engagement with the drum, a member carried by the support near the pivotal connection of said shoes and provided with an inclined surface, an inclined surface on one of the shoes adjacent the pivotal connection and inclined in the same direction as the first named inclined surface but spaced therefrom, a floating member in rolling contact with the inclined surfaces, and means for maintaining the floating member in contact with the surfaces.

5. In braking apparatus, the combination of a support, a rotatable drum, a pair of shoes pivoted together at one of their adjacent ends, said shoes being capable of limited circumferential movement, means for expanding the other adjacent ends of the shoes into engagement with the drum, a member carried by the support adjacent the pivotal connection of said shoes and provided with an inclined surface, a pair of spaced apart plates fixed to one of said shoes and forming part of said pivotal connection between the shoes, each of said plates being provided with an inclined surface, the inclined surface on each plate being inclined in the same direction as the first named inclined surface but spaced therefrom, and a floating member in rolling contact with said inclined surfaces, said member and plates being also provided with interengaging parts to prevent lateral shifting of the shoes.

6. In braking apparatus, the combination of a support, a rotatable drum, a pair of shoes pivoted together at one of their adjacent ends, said shoes being capable of limited circumferential movement, means for expanding the other adjacent ends of the shoes into engagement with the drum, a member carried by the support adjacent the pivotal connection of said shoes and provided with an inclined surface, a pair of spaced apart plates fixed to one of said shoes and forming part of said pivotal connection between the shoes, each of said plates being provided with an inclined surface, the inclined surface on each plate being inclined in the same direction as the first named inclined surface but spaced therefrom, and a floating member in rolling contact with said inclined surfaces.

7. In braking apparatus, the combination of a support, a rotatable drum, a pair of shoes pivoted together at one of their adjacent ends, said shoes being capable of limited circumferential movement, means for expanding the other ends of the shoes into engagement with the drum, a member carried by the support adjacent the pivotal connection of the shoes and provided with a pair of inclined surfaces diverging toward the drum, an inclined surface on each shoe near the pivotal connection, said surfaces on the shoes diverging toward the drum and both lying in the space between the inclined surfaces on the member carried by the support, and floating members in rolling contact with the inclined surfaces on the member carried by the support and the shoes whereby the shoes are urged toward the drum upon circumferential movement of the shoes in either direction.

8. In braking apparatus, the combination of a support, a rotatable drum, a pair of shoes pivoted together at one of their adjacent ends, said shoes being capable of limited circumferential movement, means for expanding the other ends of said shoes into engagement with the drum, an anchor for said shoes adjacent the pivotal connection comprising a plate carried by the support and provided with a pair of inclined surfaces, an inclined surface on each shoe adjacent the pivotal connection for cooperation with an inclined surface on the plate, and a pair of floating members in rolling contact with the cooperating inclined surfaces to urge the shoes toward the drum upon circumferential movement of the shoes in either direction.

9. In braking apparatus, the combination of a support, a rotatable drum, a pair of shoes pivoted together at one of their adjacent ends, said shoes being capable of limited circumferential movement, means for expanding the other ends of the shoes into engagement with the drum, an anchor for said shoes adjacent the pivotal connection comprising a plate carried by the support and provided with a pair of inclined surfaces, an inclined surface on each shoe adjacent the pivotal connection for cooperation with an inclined surface on the plate, a pair of floating members in rolling contact with the cooperating inclined surfaces to urge the shoes toward the drum upon circumferential movement of the shoes in either direction, and spring means for maintaining the floating members in contact with the surfaces.

STEVE SCHNELL.